US010505372B2

(12) United States Patent
Beekmann

(10) Patent No.: US 10,505,372 B2
(45) Date of Patent: Dec. 10, 2019

(54) METHOD FOR SUPPLYING ELECTRICAL POWER

(71) Applicant: Wobben Properties GmbH, Aurich (DE)

(72) Inventor: Alfred Beekmann, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/754,264

(22) PCT Filed: Sep. 2, 2016

(86) PCT No.: PCT/EP2016/070741
§ 371 (c)(1),
(2) Date: Feb. 21, 2018

(87) PCT Pub. No.: WO2017/037245
PCT Pub. Date: Mar. 9, 2017

(65) Prior Publication Data
US 2019/0020198 A1 Jan. 17, 2019

(30) Foreign Application Priority Data
Sep. 3, 2015 (DE) .................. 10 2015 114 704

(51) Int. Cl.
H02J 3/38 (2006.01)
F03D 7/02 (2006.01)
(Continued)

(52) U.S. Cl.
CPC ............ *H02J 3/386* (2013.01); *F03D 7/0284* (2013.01); *H02J 3/32* (2013.01); *H02J 3/48* (2013.01); *H02J 2003/007* (2013.01)

(58) Field of Classification Search
USPC ..................................... 290/44, 55
See application file for complete search history.

(56) References Cited

U.S. PATENT DOCUMENTS 6,891,281 B2   5/2005   Wobben
7,679,215 B2   3/2010   Delmerico et al.
(Continued)

FOREIGN PATENT DOCUMENTS

DE   102013207264 A1   10/2014
EP      1672779 A2      6/2006
(Continued)

OTHER PUBLICATIONS

Ali Esmaili et al., "Power Smoothing and Power Ramp Control for Wind Energy Using Energy Storage", *2011 IEEE Energy Conversion Congress and Exposition*, Sep. 17-22, 2011, pp. 922-927.
(Continued)

*Primary Examiner* — Pedro J Cuevas
(74) *Attorney, Agent, or Firm* — Seed IP Law Group LLP

(57) ABSTRACT

A method for supplying electrical power to an electrical supply grid from at least one wind power installation is provided. The supply of electrical power is controlled such that changes in the supplied electrical power are limited based on at least one limit gradient. The at least one limit gradient specifies a magnitude of a maximum change of the supplied electrical power. The least one limit gradient is set based on a property and/or an instantaneous state of the supply grid.

12 Claims, 3 Drawing Sheets

(51) Int. Cl.
*H02J 3/32* (2006.01)
*H02J 3/48* (2006.01)
*H02J 3/00* (2006.01)

(56) References Cited

U.S. PATENT DOCUMENTS

| | | | |
|---|---|---|---|
| 8,981,755 | B2 | 3/2015 | Beekmann et al. |
| 9,859,828 | B2 * | 1/2018 | Tarnowski ............... H02J 3/24 |
| 2010/0145533 | A1 | 6/2010 | Cardinal et al. |
| 2011/0074151 | A1 * | 3/2011 | Burra ..................... H02J 3/24 |
| | | | 290/44 |
| 2011/0320052 | A1 * | 12/2011 | Yasugi ................... H02J 3/16 |
| | | | 700/287 |
| 2015/0381089 | A1 * | 12/2015 | Tarnowski ............... H02J 3/24 |
| | | | 307/84 |
| 2016/0069324 | A1 | 3/2016 | Busker et al. |
| 2019/0107294 | A1 * | 4/2019 | Yabe ..................... F24D 15/04 |

FOREIGN PATENT DOCUMENTS

| | | | |
|---|---|---|---|
| EP | 2096299 | A2 | 9/2009 |
| JP | 2006511190 | A | 3/2006 |
| JP | 2006174694 | A | 6/2006 |
| WO | 2004059814 | A2 | 7/2004 |

OTHER PUBLICATIONS

TenneT TSO GmbH, "Netzanschlussregeln -Hoch- und Höchstspannung", Dec. 1, 2012, 46 pages (with machine English translation "Grid Code—High and high voltage", 46 pages).

* cited by examiner

METHOD FOR SUPPLYING ELECTRICAL POWER

BACKGROUND

Technical Field

The present invention relates to a method for supplying electrical power to an electrical supply grid from at least one wind power installation. In addition, the present invention relates to a wind power installation for supplying electrical power to an electrical supply grid. Moreover, the present invention relates to a wind farm having multiple wind power installations for supplying electrical power to an electrical supply grid.

Description of the Related Art

Wind power installations are known generally and supply electrical power to just one electrical supply grid. This also includes an electrical distribution grid. Beyond the mere supply of electrical power, it has now also become customary, and is sometimes called for by grid operators, for wind power installations also to make a contribution to grid support.

By way of example, U.S. Pat. No. 6,891,281 discloses the practice of, if need be, adapting, in particular reducing, power supplied by the wind power installation on the basis of the grid frequency, that is to say the frequency currently present and measured in the grid.

Particularly this measure is a reaction by the wind power installation to alterations in the grid and the reaction to frequency changes is moreover control or regulation on the assumption that large power plants, which use at least one synchronous generator coupled directly to the grid, dominate the grid. Particularly the correlation between grid frequency and power balance in the grid, which is also the basis for the aforementioned document, is based on this dominance of large power plants.

Insofar as the dominance of large power plants of this kind will decrease or at least can decrease, or decreases in specific regions, in future, however, it is possible for other correlations to have an effect. In particular, new problems arise when a fundamental stability as a result of a conventional power plant as described above no longer exists or one would at least not wish to rely thereon.

It may be a particular challenge to provide a stable grid on a permanent basis if large power plants of this kind do not exist or are less abundant. Particularly the provision, creation or operation of a stable grid of this kind by local power generators, such as wind power installations, can be a problem or at least a challenge. One problem in this case may be that, besides a physically different behavior than is known from large power plants, there are also far more units involved that can create, bring about or at least influence the stability or even possibly also an instability.

The German Patent and Trademark Office performed a search for the following prior art in the priority application for the present application: DE 10 2013 207 264 A1; U.S. Pat. No. 6,891,281 B2, U.S. Pat. No. 8,981,755 B2; Esmali, A; Nasiri, A., "Power smoothing and power ramp control for wind energy using energy storage," 2011 IEEE Energy Conversion Congress and Exposition (ECCE), Phoenix, Sep. 17-22, 2011 and TenneT TSO GmbH, "Netzanschlussregeln Hoch- and Höchstspannung," [Grid Codes, High Voltage and Very High Voltage], version dated Dec. 1, 2012.

BRIEF SUMMARY

A solution to stabilize an electrical supply grid is provided.

According to the invention, a method is proposed. A method for supplying electrical power to an electrical supply grid from at least one wind power installation is provided. In this case, the supply is controlled such that changes in the supplied power are limited. Changes in the supplied power that can arise from the change in the wind speed, for example, are therefore not intended to be passed on directly to the grid in every case, but rather are intended to be limited. The limiting prescribed is at least one limit gradient that stipulates the magnitude of the maximum change. The proposed limiting therefore relates to the speed of the change in the power. Thus, if the power available from the wind suddenly rises or suddenly falls, the supplied power is not intended to suddenly also rise or fall, however, but rather is meant to change with the prescribed limit gradient at maximum. Put in clear terms, a steepness of a slope for the change in the power is prescribed.

For the limit gradient, it is now proposed that it be dependent on a property of the supply grid, or that it be dependent on an instantaneous state of the supply grid. It may even be dependent on both at the same time.

This is based particularly on the notion that the effects on the grid of power changes in the supplied power may be dependent on the properties of the grid, in particular how powerful it is. Moreover or alternatively, this influence of the power change on the grid may be dependent on the instantaneous state of the supply grid, that is to say, by way of example, on whether the grid currently has an even power balance or is currently operated at a frequency exactly at the rated frequency or whether the frequency currently deviates from this rated frequency to a greater or lesser extent.

The limit gradient is therefore set on the basis of a property and/or on the basis of an instantaneous state of the supply grid. In other words, the steepness of the slope already cited for illustrative purposes for the maximum change in the supplied power is adapted to suit the grid and/or the instantaneous state thereof.

The limit gradient can indicate a percentage change per time, for example. The percentage value can relate to a rated power of the relevant wind power installation or to the rated power of the relevant wind farm, to cite just two examples. Another reference variable is also the grid rating of the relevant grid supply point, to cite a further example.

Preferably, a different limit gradient may be provided for an increase in the supplied power than for a decrease in the supplied power. In this case, not just one limit gradient is prescribed, but rather two limit gradients are prescribed. The limit gradients can be prescribed in different ways or can simply be prescribed using different values.

Preferably, the at least one limit gradient is set on the basis of a grid sensitivity of the supply grid. In this manner, it is also possible for both limit gradients to be prescribed, the correlations being able to be quantitatively different, but also being able to be the same.

At any rate, the grid sensitivity is used to define a ratio of a grid voltage change to a change in the supplied active power. This is referenced to one grid supply point. The two changes may be without units, for example by virtue of a respective percentage change being taken as the starting point. It is thus considered what influence the change in the supplied active power has on a change in the grid voltage. The greater the change in the grid voltage in relation to an equal change in the supplied active power, the greater the network sensitivity. The grid is then also more sensitive to power changes.

Such a grid sensitivity is taken as the starting point, the detection of the grid sensitivity not needing to be performed so that a percentage power change is consciously prescribed and the reaction of the grid is observed, however. The grid sensitivity can be detected online, for example, by virtue of simultaneous observation of changes in the supplied power and changes in the grid voltage.

Such a grid sensitivity can be regarded as a grid property. However, this does not include this property of the grid also being able to change. The grid sensitivity may be dependent on the physical expansion of the relevant grid, but is particularly also dependent on the size of the grid and the connected loads and generators. If a large load, such as an industrial installation, is disconnected from the grid, for example, this regularly results in a higher grid sensitivity.

Preferably, the limit gradient is, namely according to magnitude, set lower the higher the grid sensitivity. If the grid sensitivity is thus high and the grid is therefore sensitive, a low limit gradient and therefore a shallow, that is to say less steep, slope for the power changes is provided as a limit. The supplied power is thus then able to change only very slowly. If the grid sensitivity is low, on the other hand, a power change can also be made more forcefully, namely more quickly, and this is permitted by virtue of the at least one limit gradient being set higher.

According to one embodiment, it is proposed that a first limit gradient is prescribed for limiting a rise in the supplied power and a second limit gradient is prescribed for limiting a fall, that is to say a decrease, in the supplied power, said limit gradients being different. This allows different correlations to be taken into consideration for the effect of a power increase on the grid, on the one hand, and of a power decrease on the grid, on the other hand. Preferably, the first limit gradient is selected to be higher than the second limit gradient. This can also mean that adjustment instructions are used that distinguish, in particular quantitatively distinguish, between the first and the second limit gradient such that different magnitudes of limit gradients come to light.

The prescribing of a higher limit gradient for the rise in the power assumes that a power increase is less critical to grid stability than a power decrease.

According to one embodiment, it is proposed that a fall in the supplied power is limited by virtue of electrical power from an electrical buffer store being used. It should first of all be noted that a wind power installation frequently supplies as much power as it can draw from the wind on the basis of current wind conditions. If the wind then drops, there is fundamentally also less power that may be supplied available. Limiting the power drop could then mean that more power is meant to be supplied, at least in the short term, than is actually available. To be able in this situation to nevertheless implement such a limit gradient, that is to say the restriction of the power drop to a particular gradient, additional power is needed. To this end, a buffer store is proposed. One option, particularly for a short-term process, is to use the DC link if the wind power installation operates on the basis of the full converter concept. Such a DC link can provide electrical power only for a very short period, however. Firstly, less power is stored in it, and secondly, drawing electrical power from the DC link results in a voltage drop in the DC link that can adversely influence the supply.

In addition or alternatively, kinetic energy of the wind power installation, particularly from the rotating aerodynamic rotor and/or the rotating rotor of the generator, can be used. In this case too, it should be noted that kinetic energy of this kind is sufficient only for a short period to slow down the decrease in the power. Depending on the situation, the stored kinetic energy may be sufficient, however. Moreover, it should be noted that there can be the risk that the decrease in the rotation speed can result in an adverse operating state in this case. In the extreme case, continued operation of the installation may even be at risk, which would lead to an additional problem.

Preferably, an additional, in particular external, buffer store, in particular an electrical buffer store, is provided. This may be configured as a battery bank, for example, that is provided for such power buffering and can also be dimensioned for this purpose.

According to one refinement, it is proposed that the wind power installation is prepared to accept electrical power from the supply grid. This electrical power can be supplied to an electrical buffer store, for example, particularly to the one described above. In addition or alternatively, such a power drawn from the grid can also be consumed by means of applicable resistor banks, that is to say converted into heat and emitted.

For this electrical power to be accepted from the supply grid, it is now proposed that the change therein is also limited by means of at least one or the at least one limit gradient. In this case too, it is therefore proposed that this drawn electrical power also increases or decreases only along an applicable slope of change. Particularly when a drawing process of this kind is started, the power to be drawn is intended to be ramped up slowly. Even when this power draw is ended, the drawn power is intended to be rolled back, that is to say lowered back, slowly again. This can be limited or else specifically prescribed by the limit gradient. For this, it is possible to use the same limit gradients as for changing the delivered power. Alternatively, other limit gradients can be determined and these other limit gradients can also meet such demands or, in principle, be set as has been described above in some embodiments for setting the limit gradients for the supplied power.

According to one embodiment, it is proposed that the at least one limit gradient is moreover set on the basis of a short-circuit current ratio. The short-circuit current ratio, which is defined in a manner referenced to the grid connection point, can be used to take into consideration an additional piece of information about a property of the electrical supply grid. If the short-circuit current ratio is high, and is at the value 10, for example, then a comparatively strong grid exists, at any rate referenced to this grid connection point, which means that a stronger and faster power fluctuation is tolerated.

In addition or alternatively, it is proposed that the at least one limit gradient is also set on the basis of the absolute value of the grid voltage. As a result, it is possible to take into consideration that an already low voltage can necessitate stronger limiting of the power change, for example. Preferably, it is proposed here that at low voltages, particularly voltages that are below a rated voltage, the positive limit gradient is chosen to have a higher magnitude than the negative limit gradient. If the voltage is correspondingly high, the converse procedure may be used, that is to say a positive limit gradient with a smaller magnitude than the negative limit gradient can be chosen.

According to a further refinement, it is additionally or alternatively proposed that the limit gradients or the at least one limit gradient are altered on the basis of a grid frequency, namely on the basis of a detected actual frequency in the electrical supply grid. The grid frequency can also provide an indication of the grid state. Particularly when the grid frequency is very high, a power surplus in the grid can be assumed and the limit gradients or the at least one limit gradient can be set accordingly.

By way of example, when there is an assumed power surplus of this kind in the grid, there may be provision for the positive limit gradient to be selected to have a smaller magnitude than the negative limit gradient, to cite just one example of an application.

According to a further embodiment, it is proposed that the limit gradient is adapted on the basis of a property and/or an instantaneous state of the supply grid.

The limit gradient is therefore dynamically adapted to suit the supply grid. Accordingly, a single rigid limit gradient is not set, but rather a limit gradient that has been adapted to suit the prevailing properties of the supply grid. The limit gradient itself is set on the basis of the applicable property or the applicable instantaneous state of the supply grid in this case.

According to a further embodiment, it is proposed that the limit gradient is altered on the basis of a property and/or an instantaneous state of the supply grid.

The limit gradient is therefore dynamically altered and adapted to suit the properties and/or the instantaneous state of the supply grid in the course of operation of the installation. By way of example, the supply grid has a first, normal operating state and the installation is operated using a first gradient that corresponds to this state. If an altered state of the supply grid now arises, for example as a result of a fault, the limit gradient is altered accordingly and the installations are operated using this altered, the second, limit gradient.

A wind power installation is also proposed that supplies electrical power to an electrical supply grid and employs the method according to at least one of the embodiments described above.

A wind farm is also proposed that has multiple wind power installations. The wind farm can supply to the electrical supply grid by means of a method according to at least one of the embodiments described above. In addition or alternatively, it can use one, multiple or all of its wind power installations according to a wind power installation that is controlled using a method as has been described for at least one embodiment above.

In this respect, the wind farm can, all in all, firstly supply as has been explained above, that is, in particular, can limit the change in its power by means of a limit gradient, or each wind power installation in the wind farm performs such a method on its own and limits the supplied power by itself. If all the wind power installations in the farm operate in the same fashion and set the same limit gradient or set it in the same manner, the result may be the same. If particularly a mixed farm is a feature, however, then it may make sense to prescribe this power change limitation centrally from the wind farm.

BRIEF DESCRIPTION OF THE SEVERAL VIEWS OF THE DRAWINGS

The invention will now be explained in more detail below on the bases of embodiments with reference to the accompanying figures.

DETAILED DESCRIPTION

Figure 1:
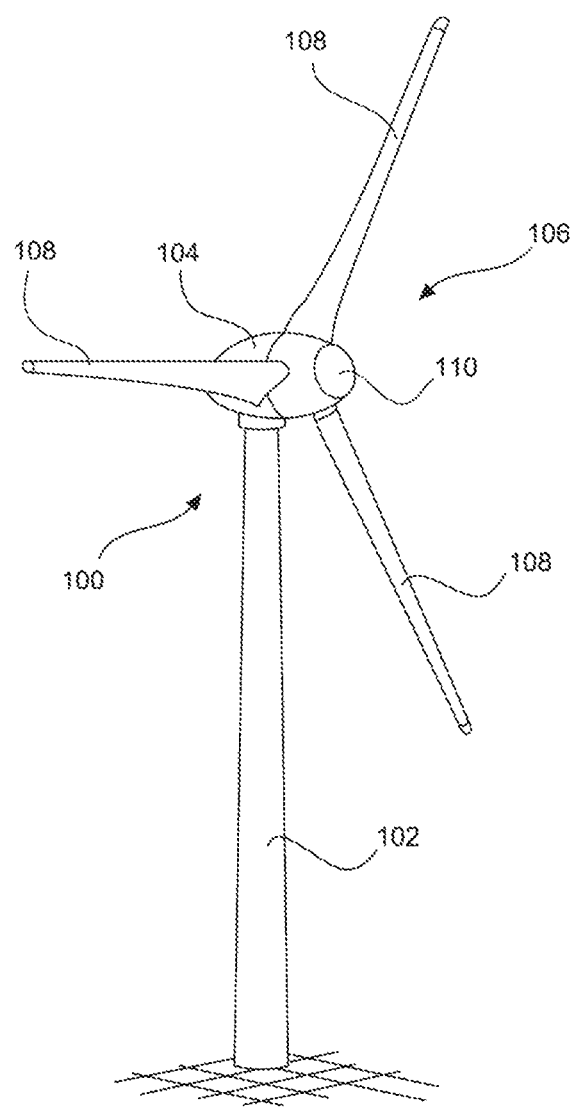
FIG. 1 shows a perspective depiction of a wind power installation.

FIG. 1 shows a wind power installation 100 having a tower 102 and a nacelle 104. A rotor 106 comprising three rotor blades 108 and a spinner 110 is arranged on a nacelle 104. The rotor 106 is caused to effect a rotational movement by the wind during operation and thereby drives a generator in the nacelle 104.

Figure 2:
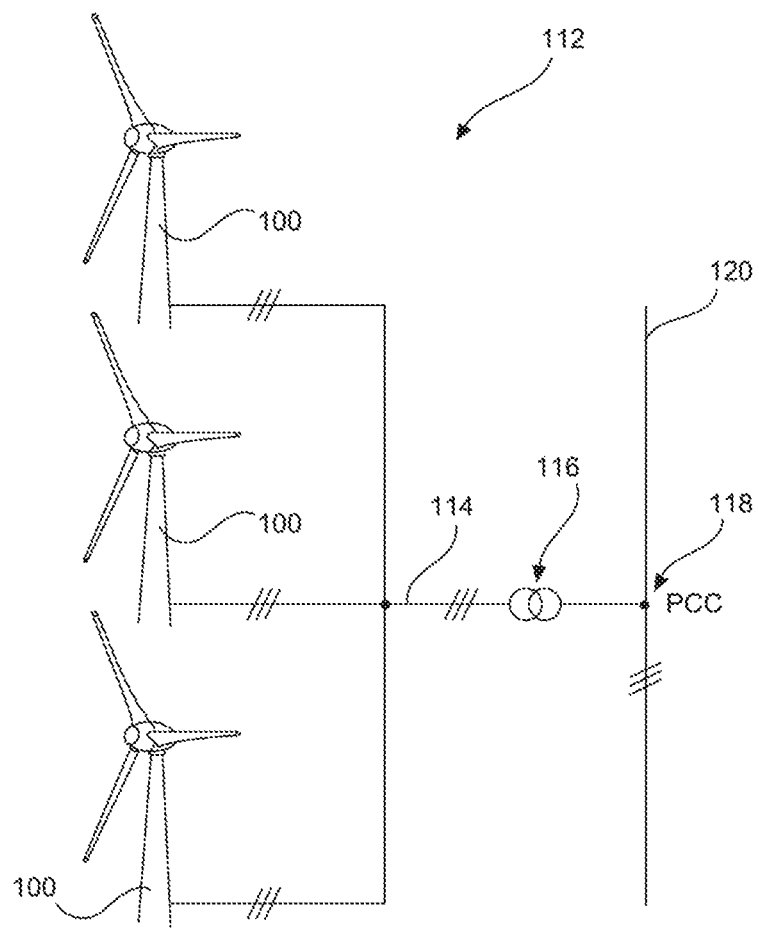
FIG. 2 shows a diagram of a schematic of a wind farm.

FIG. 2 shows a wind farm 112 having, by way of example, three wind power installations 100, which may be the same or different. The three wind power installations 100 are therefore representative of basically any number of wind power installations on a wind farm 112. The wind power installations 100 provide their power, namely in particular the generated current, via an electrical farm grid 114. The respectively generated currents or powers of the individual wind power installations 100 are added in this case and, for the most part, a transformer 116 is provided that steps up the voltage on the farm so as then to supply to the supply grid 120 at the supply point 118, also referred to in general as a PCC. FIG. 2 is only a simplified depiction of a wind farm 112 but does not show a controller, for example, even though a controller is naturally a feature. It is also possible for the farm grid 114 to be in a different form, for example, in which a transformer at the output of each wind power installation 100 is also a feature, for example, to cite just one other exemplary embodiment.

Figure 3:
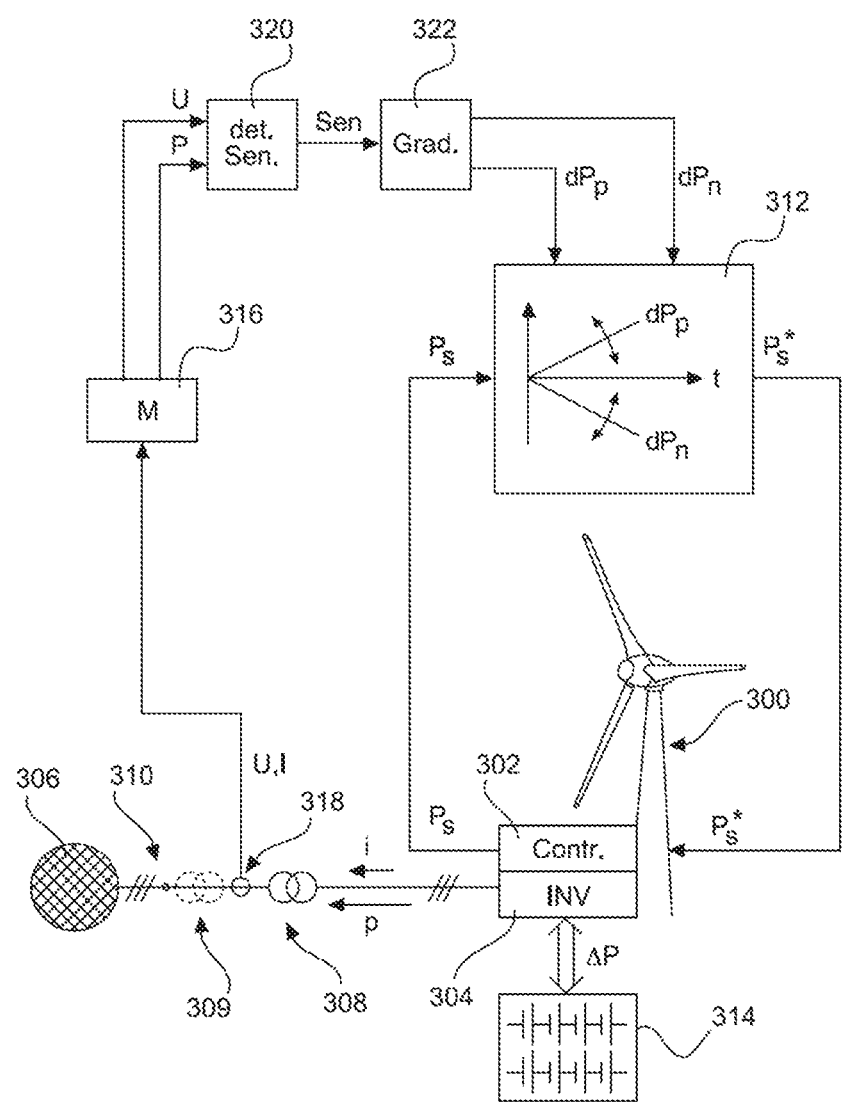
FIG. 3 schematically shows a structure of an embodiment described herein.

FIG. 3 schematically shows a structure of an embodiment described herein. It schematically shows a wind power installation 300 that has at least one control unit 302 and an inverter 304. The control unit 302 controls the supply of electrical power P, inter alia, which is formed by means of the inverter 304. In this respect, the control unit 302 controls the inverter 304. The control unit 302 may have various further functions, however, and can control further elements of the wind power installation 300, in particular.

The inverter 304 therefore supplies power P to an electrical supply grid 306 via a transformer 308. The output of the transformer 308 can be regarded as a grid connection point 310. The use of a transformer 308 is customary, but not absolutely necessary.

At a steady or quasi-steady operating point, the wind power installation 300 generates electrical power P if there is sufficient wind and supplies electrical power to the electrical supply grid 306. In fact, the inverter 304 does this by generating an electrical current i that is supplied at applicable voltage and is usually three-phase. It is now possible for different reasons for this supplied power P being changed or needing to be changed to arise. One possibility is that the wind increases, for example, which means that more power can be supplied if maximum power was not already supplied previously. However, other possibilities are also feasible, such as a power reduction to reduce noise or a power change on the basis of a request from the grid operator, for example. Accordingly, it is also possible to increase the power when operating at a reduced power on account of noise is ended.

In each case, the control unit 302 controls the power P that the inverter supplies or is meant to supply.

To that end, the control unit 302 can generate a power setpoint value $P_s$. The inverter 304 could implement such a power setpoint value $P_s$.

It is now proposed that the supplied power P is not meant to change at an arbitrary rate. At least the aim is for this change to be monitored and then if need be controlled.

Therefore, the setpoint power $P_s$ is initially supplied to a limiting block 312. This limiting block 312 prescribes a limit gradient $dP_p$ for a power rise and prescribes a negative limit gradient $dP_n$ for a power fall of maximum magnitude, that is to say a maximum negative slope for a power fall. The power setpoint value $P_s$ is therefore input into this limiting block 312 and output again unchanged as a modified power setpoint value $P_s^*$ if the change in this power setpoint value is within the prescribed limit gradient, that is to say if the power setpoint value $P_s$ does not rise too quickly and also does not fall too quickly.

If the power setpoint value $P_s$ rises too quickly, however, namely such that the limit gradient $dP_p$ would be exceeded or the negative limit gradient $dP_n$ would be undershot, then this power setpoint value is adapted such that the limits are not exceeded or undershot. In this case, the modified power setpoint value $P_s^*$ differs from the power setpoint value $P_s$ that is input into the limiting block 312.

In each case, the modified power setpoint value $P_s^*$ is supplied to the control unit 302 and the inverter 304 is then controlled such that the supplied power P corresponds to the modified power setpoint value $P_s^*$.

In some situations, an actually modified setpoint value $P_s^*$ can correspond to a power stipulation that does not correspond to the power available in the wind at that moment. This modified setpoint value $P_s^*$ may be at least intermittently greater or less than the available power. This results in a power difference between available power and power $P_s^*$ to be supplied. This difference power is indicated as $\Delta P$ in FIG. 3 and may be either positive or negative. According to the embodiment of FIG. 3, it is proposed that such a difference power $\Delta P$ is stored in and drawn from an energy store 314. This proposed limiting of the power change may initially be undesirable for the operator of the wind power installation 300. This is accepted in this case, however, in order to ensure stabilization of the electrical supply grid 306 as a priority. Otherwise, the energy store 314 is illustrated as a battery store, but may also be configured differently, for example as a flywheel store, a hydrogen store or as a combination of different types of store, to cite a further example.

However, it has now been recognized that sometimes the same limit gradients are not always an optimum or even simply necessary grid support. It is, therefore, proposed that the limit gradients $dP_p$ and $dP_n$ are altered on the basis of grid properties and/or grid states. A preferred embodiment is to make this change on the basis of a grid sensitivity. This is illustrated in FIG. 3. It is also possible for other or additional grid properties or grid states to be taken into consideration, however, this not being depicted in said figure.

At least current I and voltage U are measured at a measuring point 318 and evaluated in the measuring block 316. The measuring block 316 determines the supplied power P therefrom and transmits it, together with the voltage U, to the sensitivity block 320. Alternatively, the modified power setpoint value $P_s^*$ can also be used here, since it indicates the power that is supposed to be supplied. For the actual detection of the grid sensitivity, however, the proposal here is for the actually supplied power to be detected and therefore the measurement of the measuring point 318 and evaluation of the measuring block 316 to be used.

The current I and voltage U are detected at the grid connection point 310. The detection can also be performed on the wind power installation side of the transformer 308. A possible alternative is for an additional transformer 309 to be present in order to increase the voltage downstream of the transformer 308 to the electrical supply grid 306 once again. This additional transformer 309 is therefore shown in dashes. The measuring point 318 may be arranged between the two transformers 308 and 309 for this case, or on the grid between the additional transformer 309 and the electrical supply grid 306.

Preferably, the voltage measurement is performed using a state observer or measuring filter. This can be performed in the measuring block 316. Preferably, the voltage measurement is performed as proposed for the voltage measurement in U.S. Pat. No. 8,981,755 B2.

Based on the power P detected in this manner and the voltage U detected in this manner, a grid sensitivity Sen can be determined in the sensitivity block 320. It should be noted that in this case the power P and the voltage U are detected as dynamically as possible and, in particular, changes are also taken into consideration here. The grid sensitivity Sen can be detected as the ratio of the voltage change to a change in the supplied power in this case.

This grid sensitivity Sen is then provided to the gradient block 322. The latter generates corresponding values for the positive limit gradient $dP_p$ and the negative limit gradient $dP_n$ at least on the basis of this input grid sensitivity Sen. Said values can be generated on the basis of predetermined tables, for example. However, it is also possible for further values to be taken into consideration. By way of example, there may also be dependency on the absolute voltage value U. Accordingly, the detected voltage U would also need to be transferred to the gradient block 322, this not being depicted here for the sake of simplicity.

At any rate, these two generated gradient values $dP_p$ and $dP_n$ are input into the limiting block 312 in order to alter the slopes if need be as appropriate.

Therefore, this can prevent excessive fluctuation of the supply of power. In this context, a grid having low grid sensitivity is capable of tolerating a more intense or faster power change than a grid having a high grid sensitivity. In this case, it should be noted that this grid sensitivity can change quickly and therefore it is also proposed that it is detected and then the applicable limit gradients are adapted.

FIG. 3 therefore illustrates the principle for a single wind power installation 300. The illustrated function blocks, namely in particular the limiting block 312, the sensitivity block 320 and the gradient block 322, may also be part of the wind power installation 300, in particular part of the control unit 302. The depiction in FIG. 3 is intended for illustrative purposes, in particular.

Moreover, the structure shown in FIG. 3 can be used quite similarly for a wind farm. A possible modification for a wind farm involves the limiting block 312 receiving as input power not the power setpoint value $P_s$ but rather a sum of all the power setpoint values of all wind power installations on the farm. This summed power is then input into the limiting block 312 as a setpoint value and modified if need be. The accordingly output modified power setpoint value is in this respect also a power sum or a summed power value that can then be provided via a distribution block, the distribution block splitting this summed power according to a prescribed key and/or on the basis of specific circumstances in the wind farm. In the simplest case, the split is performed such that each wind power installation in the farm receives an equal proportion. This applies particularly if the wind farm has only identical wind power installations, at least wind power installations of the same size, and none of the wind power installations has a fault. If wind power installations are a different size and combined on a farm, however, such a distribution key can also be chosen differently.

Preferably, the choice of the limit gradient or at least of the one limit gradient is also or alternatively also dependent on a short-circuit current ratio of the electrical supply grid 306 referenced to the grid connection point 310. Moreover or alternatively, the choice of the at least one limit gradient is also dependent on the present voltage in the grid, that is to say on the absolute value of the voltage in the grid. As such, the procedure for a low grid voltage U can be similar to that for a high grid sensitivity, for example, specifically by virtue of particularly low limit gradients, in terms of their magnitude, then being provided. In this respect, the grid voltage can also be regarded as a grid state and the short-circuit current ratio as in the grid property.

The invention claimed is:

1. A method for supplying electrical power to a supply grid from at least one wind power installation, the method comprising:
   setting at least one limit gradient based on at least one of a property or an instantaneous state of the supply grid, the at least one limit gradient specifying a magnitude of a maximum change in the supply of the electrical power,
   controlling the supply of the electrical power such that changes in the supplied electrical power are limited to the at least one limit gradient, and
   supplying the electrical power to the supply grid from the at least one wind power installation.

2. The method as claimed in claim 1, comprising:
   setting the at least one limit gradient based on a grid sensitivity of the supply grid, wherein the grid sensitivity is a ratio of a grid voltage change and a change in a supplied active power.

3. The method as claimed in claim 2, wherein setting the at least one limit gradient based on the grid sensitivity includes setting the at least one limit gradient to be negatively correlated with the grid sensitivity.

4. The method as claimed in claim 1, wherein setting the at least one limit gradient includes:
   setting a first limit gradient for limiting a rise in the supplied electrical power, and
   setting a second limit gradient for limiting a fall in the supplied electrical power, the first limit gradient and the second limit gradient being different.

5. The method as claimed in claim 4, wherein the first limit gradient is greater than the second limit gradient.

6. The method as claimed in claim 1, comprising:
   supplying, from a buffer store, stored electrical power to limit a fall in the supplied electrical power.

7. The method as claimed in claim 1, wherein the wind power installation is configured to draw electrical power from the supply grid.

8. The method as claimed in claim 7, comprising:
   limiting a change in the drawn electrical power based on the at least one limit gradient.

9. The method as claimed in claim 1, wherein setting the at least one limit gradient based on the at least one of the property or the instantaneous state of the supply grid includes setting the at least one limit gradient based on at least one of a plurality of instantaneous states including:
   a short-circuit current ratio at a grid connection point to the supply grid,
   a grid voltage of the supply grid, and
   a grid frequency of the supply grid.

10. The method as claimed in claim 1, comprising:
    changing the at least one limit gradient based on at least one of the property or the instantaneous state of the supply grid.

11. A wind power installation for supplying electrical power to a supply grid, comprising:
    at least one control unit configured to control the supply of the electrical power to the supply grid such that changes in the supplied electrical power are limited to at least one limit gradient that is set based on at least one of a property or an instantaneous state of the supply grid and that specifies a magnitude of a maximum change in the supply of the electrical power; and
    an inverter, controlled by the at least one control unit, configured to supply the electrical power to the supply grid.

12. A wind farm having a plurality of wind power installations, wherein at least one wind power installation of the plurality of wind power installations is the wind power installation as claimed in claim 11.

* * * * *